United States Patent Office

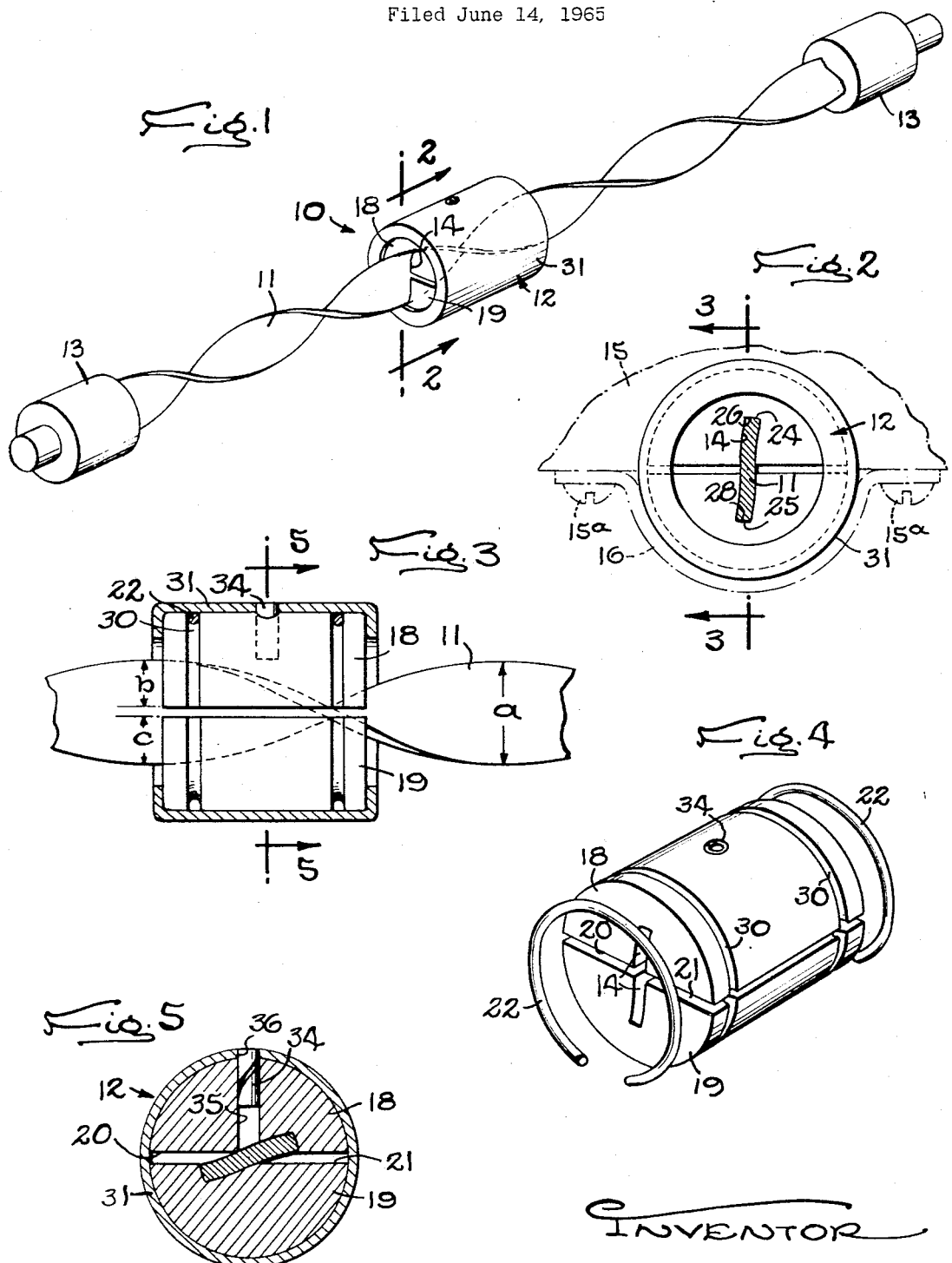

3,364,757
Patented Jan. 23, 1968

3,364,757
POSITIONING DEVICE
Richard E. Sears, Birmingham, Mich., assignor to Beaver Precision Products, Inc., Clawson, Mich., a corporation of Delaware
Filed June 14, 1965, Ser. No. 463,669
5 Claims. (Cl. 74—89.15)

ABSTRACT OF THE DISCLOSURE

A precision positioning device including a bar screw extending through a correspondingly shaped screw passage in a nut and operable to cause relative longitudinal movement of the nut along the screw as an incident to relative rotation of the nut and the screw. The nut is formed as two split sections, each of which defines a portion of the screw passage, and is assembled to the screw with opposing faces of the sections held spaced from each other by the screw. A pair of ring-type springs surround the segments and press the latter tightly against the screw to minimize backlash while automatically taking up play resulting from wear of the screw and the nut.

Background of the invention

This invention relates to a device for positioning a part and, more particularly, to a device of the type having a nut and elongated bar screw which, by passage of the bar through a screw passage in the nut fitting the configuration of the bar, causes the nut to move along the bar upon relative rotation of the two.

Summary of the invention

The primary object of this invention is to provide such a device which is simple in construction and which, by reducing play between the bar and nut in a novel manner, accurately positions the part.

Another object of this invention is to maintain accuracy in such a device by automatically compensating for play due to wear resulting from use of the device.

In its more detailed aspects, the invention aims to provide a bar screw positioning device which is easily assembled even where the ends of the bar are fastened down and the nut cannot be slipped over the end of the bar.

Brief description of the drawings

FIGURE 1 is a perspective view of a bar screw device incorporating the subject invention;

FIG. 2 is a slightly enlarged view along the line 2—2 of FIG. 1.

FIG. 3 is a cross-sectional view along the line 3—3 of FIG. 2.

FIG. 4 is an exploded perspective view of the nut.

FIG. 5 is a cross-sectional view along the line 5—5 of FIG. 3.

Description of the preferred embodiment

As shown in the drawings for purposes of illustration, the invention is embodied in a positioning device 10 (FIG. 1) which includes a bar screw 11 threaded through a nut 12 by passage of the bar through an internal screw passage 14 in the nut such that, upon relative rotation between the two, the nut is translated along the bar. While the bar screw may be formed in various ways, it preferably is formed by twisting one end of an elongated bar member relative to the other end to produce a uniformly twisted bar 11 as shown. This bar screw is supported between end supports 13 which are fastened to opposite ends of the screw. One common usage of such a device is illustrated in FIGS. 1 and 2 where it is desired to position a part 15 selectively along the length of the bar 11 and, for purpose, the part is attached to the nut 12 by screws 15a passing through holes in a strap 16 extending around the opposite side of the nut to hold the part on the nut. By rotation of the bar, the nut and the part are translated along the bar. Of course, either the nut or bar may be held from rotating and, by rotation of the other, translation of a non-rotating element is effected and that element may be utilized to produce the positioning function.

In accordance with the invention, the positioning device 10 is constructed in a novel manner so that the movement of the nut 12 relative to the bar screw 11 is precisely correlated with the relative angular movement between the nut and the screw. To this end, the nut is formed of a plurality of segments, preferably two, with each segment forming a portion of the entire length of the screw passage such that the segments may be joined and clamped together around the bar to form the nut. The portions of the screw passage in each segment are made shallow enough to cause the passage walls to contact the bar before the opposing faces of the segments contact each other, and the segments are resiliently urged together to minimize any play between the nut and bar.

As shown in the drawings, the nut 10 may be cylindrically shaped and includes the screw passage 14 running lengthwise therethrough to receive the bar 11. In the exemplary embodiment, the nut includes two half-segments 18 and 19 with opposing faces 20 and 21 which extend lengthwise of the nut and across the screw passage so that each segment defines a portion of the entire length of the passage. The segments preferably are made of a low-friction material, such as Teflon, which may be molded to the desired shape. By making the nut in half-segments, the manufacturing operation is simplified in that the passage can be formed more easily in each segment during the molding process. Also, the nut can be mounted on and removed from a bar screw even though both ends of the latter are attached to a supporting structure and this is achieved simply by fitting the segments together around the bar and clamping them together.

The portions of the screw passage in each segment 18 and 19 are made somewhat shallower than the corresponding dimension of the bar whereby the bar contacts the opposing sides of the passage before the faces 20 and 21 contact each other. By this arrangement, the faces are spaced slightly apart and by resiliently urging the segments together, the latter are pressed tightly against the bar to reduce play in the device. The parts are urged together by one or more springs 22 which act on both segments to press the two toward each other.

As shown in FIGS. 2 and 3, the width $a$ between the opposite edges 24 and 25 of the bar is greater than the sum of the depths $b$ and $c$ of the grooves formed in the segments 18 and 19, respectively and forming the screw passage such that, when the bar and segments are assembled, the opposite sides 26 and 28 of the grooves contact the edges 24 and 25 of the bar before the faces 20 and 21 come together. Thus, the segments ride against the bar as the nut moves along the bar thereby holding these faces in spaced relationship. The springs 22 may take various forms and in the present instance, are split rings fitting around a portion of both segments (FIG. 4) to press the segments against the bar and thereby preload the sides of the screw passage against the bar. Play in the positioning device thus is reduced, even with subsequent wear of the nut or bar, since the springs maintain the contact between the bar and nut segments at all times.

For protection of the nut 12 and for ease of mounting it on the part 15 to be moved, a housing 31 in the form of a sleeve may be slipped over the nut with the ends of the housing bent over the nut ends to hold it in place. Means are provided to prevent relative rotation of the housing and nut and, herein, the means comprises a screw 34 inserted through alined openings 35 and 36 in the nut and housing, respectively. The springs 22 are mounted in grooves 30 to hold them in position and lessen contact with the housing, the grooves being formed in the nut segments 18 and 19.

It will be observed that the springs 22 keep the segments 18 and 19 of the nut 12 in firm contact with the screw 11. Moreover, the springs take up any wear between the screw and the nut. Thus, the screw continues to fit snugly in the passage 14 of the nut and this results in a precise correlation of the linear movement of the nut with the angular movement of the screw. Accordingly, the nut and the screw accurately position the part 15.

I claim as my invention:

1. In a positioning device, the combination of a bar twisted to form an elongated screw, a nut including an internal screw passage extending therethrough closely fitting the configuration of said twisted bar, said nut being formed of two segments with each segment defining a portion of said passage and including a face opposing that of the other segment, the portion of said passage formed in each of said segments being shallower than the corresponding dimension of the bar whereby said segments when engaging said bar are held with the opposing faces in spaced relationship, a continuous groove extending around both of said segments, a spring positioned in said groove and operable to urge said segments toward each other and against said bar, a housing positioned around said segments including means to prevent relative rotation therewith, and means operable on said bar and said nut to hold one against turning and to turn the other about its longitudinal axis whereby the nut moves axially relative to said bar and in accurate relation to such turning.

2. In a positioning device, the combination of a bar twisted to form an elongated screw, a nut including an internal screw passage extending therethrough closely fitting the configuration of said twisted bar, said nut being formed of two segments with each segment disposed on one side of the axis of said bar and defining a portion of said passage, the portion of said passage formed in each of said segments being shallower than the corresponding dimension of the bar whereby said segments when engaging said bar are held in spaced relationship, a continuous groove extending around both of said segments, a spring positioned in said groove and operable to urge said segments toward each other and against said bar, and means operable on said bar and said nut to hold one against turning and to turn the other about its longitudinal axis whereby the nut moves axially relative to said bar and in accurate relation to such turning.

3. In a positioning device, the combination of a bar twisted to form an elongated screw, a nut including an internal screw passage extending therethrough closely fitting the configuration of said twisted bar, said nut being formed of two segments with each segment disposed on one side of the axis of said bar and defining a portion of said passage, the portion of said passage formed in each of said segments being shallower than the corresponding dimension of the bar whereby said segments when engaging said bar are held in spaced relationship, a spring positioned around said segments to urge them toward each other and against said bar, and means operable on said bar and said nut to hold one against turning and to turn the other about its longitudinal axis whereby the nut moves axially relative to said bar and in accurate relation to such turning.

4. In a positioning device, the combination of a bar twisted about its longitudinal axis to form an elongated screw, a nut including an internal screw passage extending therethrough closely fitting the configuration of said twisted bar, said nut being formed of two segments with a portion of each segment disposed to one side of the axis of said passage and defining part of said passage, said part of said passage formed by said segments being shallower than the corresponding dimension of the bar whereby said segments when engaging said bar are held in spaced relationship with the axis of said passage coinciding with the axis of said bar, means interconnecting said segments and operable to draw said segments bodily toward each other and in contact with said bar while maintaining the axis of said passage coincidental with the axis of said bar, and means operable on said bar and nut to hold one against turning and to turn the other about its longitudinal axis whereby the nut moves axially relative to said bar and in accurate relation to such turning.

5. In a positioning device, the combination of, a bar twisted to form an elongated screw, a nut including an internal screw passage extending therethrough and closely fitting the configuration of said twisted bar, said nut being formed of two segments with each segment defining a portion of said passage and including a face opposing that of the other segment and disposed parallel to the other face, the portion of said passage formed in each of said segments being shallower than the corresponding dimension of the bar whereby said segments when engaging said bar are positioned with the opposing faces in spaced relationship, means interconnecting said segments and operable to draw said segments toward each other and in contact with said bar while maintaining said opposing faces parallel to one another, and means operable on said bar and nut to hold one against turning and to turn the other about its longitudinal axis whereby the nut moves axially relative to said bar and in accurate relation to such turning.

References Cited

UNITED STATES PATENTS

| 291,012 | 12/1883 | Kern et al. | 74—424.8 |
| 2,369,910 | 2/1945 | Morgan | 74—89.15 |
| 2,740,617 | 4/1956 | Ball et al. | 74—89.15 |

FRED C. MATTERN, Jr., *Primary Examiner.*

W. S. RATLIFF, *Assistant Examiner.*